(12) United States Patent
Osawa

(10) Patent No.: US 6,468,463 B1
(45) Date of Patent: Oct. 22, 2002

(54) METHOD FOR PRODUCING MOLDED FLUOROELASTOMER PARTS

(75) Inventor: Yasuhisa Osawa, Usui-gun (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

(21) Appl. No.: 09/558,037

(22) Filed: Apr. 26, 2000

(30) Foreign Application Priority Data

Apr. 28, 1999 (JP) .......................................... 11-122400

(51) Int. Cl.$^7$ .............................................. B29C 45/27
(52) U.S. Cl. .............................. 264/328.1; 264/328.18; 264/338
(58) Field of Search ........................ 264/328.1, 328.18, 264/337, 338; 425/542; 249/134, 135, 114.1, 115, 116

(56) References Cited

U.S. PATENT DOCUMENTS

| | | | | |
|---|---|---|---|---|
| 3,857,807 A | * | 12/1974 | Kometani et al. ............. | 524/92 |
| 5,112,025 A | * | 5/1992 | Nakayama et al. ....... | 249/114.1 |
| 5,236,631 A | * | 8/1993 | Osawa ....................... | 252/502 |
| 5,310,800 A | * | 5/1994 | Shimizu et al. ............. | 524/413 |
| 5,371,150 A | * | 12/1994 | Osawa et al. ............. | 525/326.2 |
| 5,508,355 A | * | 4/1996 | Toda et al. ............... | 525/326.3 |
| 5,628,519 A | * | 5/1997 | Kakehi ................... | 264/328.12 |
| 5,635,220 A | * | 6/1997 | Izumi et al. ........... | 264/272.17 |
| 6,005,030 A | * | 12/1999 | Togawa et al. ............. | 428/901 |
| 6,297,339 B1 | * | 10/2001 | Osawa et al. ............... | 523/205 |

FOREIGN PATENT DOCUMENTS

| JP | 6-106543 | * | 4/1994 |
|---|---|---|---|
| JP | 6-151490 | * | 5/1994 |
| JP | 11-58404 | * | 3/1999 |

OTHER PUBLICATIONS

Patent Abstracts of Japan vol. 18, No. 383; Jul. 19, 1994 & JP 06 106543.
Patent Abstracts of Japan vol. 1999, No. 08; Jun. 30, 1999 & JP 11 058404.
Patent Abstracts of Japan vol. 18, No. 679; Dec. 21, 1994 & JP 06 270154.
Patent Abstracts of Japan vol. 18, No. 461; Aug. 26, 1994 & JP 06 154490.
Patent Abstracts of Japan vol. 15, No. 25; Jan. 21, 1991 & JP 02 269015.
Patent Abstracts of Japan vol. 18, No. 452; Aug. 23, 1994 & JP 06 143350.

* cited by examiner

Primary Examiner—Jill L. Heitbrink
(74) Attorney, Agent, or Firm—Millen, White, Zelano & Branigan, P.C.

(57) ABSTRACT

A mold for producing molded fluoroelastomer parts has a mold cavity, a gate, and a runner and a sprue through which the gate communicates with an injection molding machine wherein an inorganic filler-containing crosslinkable liquid fluoroelastomer composition is injected into the mold cavity through the gate. The gate portion of the mold is surface treated with diamond-like carbon and has a cross-sectional area where it opens out into the mold cavity of 0.075–10 mm$^2$. This combination of features lowers wear at the mold gate, thereby increasing the useful life of the mold, and also improves the mold release properties.

3 Claims, 3 Drawing Sheets

MATERIAL (INJECTION RATE:1cc/s)

METHOD FOR PRODUCING MOLDED FLUOROELASTOMER PARTS

The present invention relates to a mold for producing molded parts from inorganic filler-containing crosslinkable liquid fluoroelastomer compositions, and to a method for producing molded fluoroelastomer parts using this mold. More particularly, it relates to a mold useful for molding fluoroelastomer parts in a liquid injection molding system (LIMS), and to a method for producing molded fluoroelastomer parts by LIMS molding with this mold.

BACKGROUND OF THE INVENTION

Conventional vinylidene fluoride-type fluoroelastomers are endowed with many excellent properties, including heat resistance, chemical resistance and mechanical strength, and thus are used in a broad range of industrial applications, most particularly in the automotive and machine industries.

However, these prior-art fluoroelastomers have an inadequate resistance to chemicals. That is, they swell easily in polar solvents such as ketones, lower alcohols, carbonyls and organic acids, and they deteriorate in amine-containing chemicals, resulting in a drastic decline in elastomer strength and elongation. The low-temperature properties of such fluoroelastomers also leave something to be desired. For example, at temperatures below −20° C., they lose their rubber-like elasticity, making them useless as seals. This has generally restricted their use in cold-weather climates.

One approach that has been taken to overcome these drawbacks is the use of curable fluorinated compositions composed primarily of perfluorocarbon compounds and fluorinated organohydropolysiloxanes.

Because perfluorocarbon compounds have a low degree of polymerization and are liquid, the above compositions are also liquid, making them well-suited to a formed-in-place gasket (FIPG) process or LIMS molding.

Moreover, because such compositions have excellent characteristics such as oil resistance, chemical resistance, low temperature properties and heat resistance, they are often used as seals in automobiles and aircraft. The needs that exist in such applications for improved strength and compression set, and for even better oil resistance and chemical resistance, have made selection of the reinforcing filler a topic of considerable importance.

To satisfy such needs, the common practice is to blend several different fillers into the composition so as to take advantage of the distinctive particle size and surface area characteristics of the different fillers.

However, some fillers, when present in a composition that is made to flow rapidly, will exhibit abrasive effects upon striking mold surfaces. Depending on the shape of the molded article, such fillers may give rise to wear in the mold, particularly in the gate portion of the mold.

O-rings and other types of seals need to be precisely molded to increase their airtightness. Because there are often very strict limits on defects such on flash and gate marks, it is necessary to use a mold construction in which areas of material flow such as gates and the cut-off are finished to very small (thin) dimensions. When the composition passes through these thin areas, depending on the type of filler, the mold may be subjected to abrasion for the reason mentioned above.

Filler that abrades the mold in such cases has an average particle size of at least 0.1 μm. Relatively little mold wear occurs at smaller particle sizes.

LIMS molding is particularly suitable for mass production, in part because it is readily amenable to shortening or automation of the molding cycle. However, the molds used for this purpose are of complex construction and thus expensive compared with conventional two-piece rubber molds. Hence, mold wear is a serious problem. Although mold construction and surface treatment are of paramount importance for holding down production costs and maintaining consistent quality, an optimal mold construction and optimal surface treatment for the LIMS molding of liquid fluoroelastomer compositions have yet to be established. For this reason, it has been difficult to obtain finished products of consistent quality.

SUMMARY OF THE INVENTION

It is therefore an object of the invention to provide a mold for producing molded fluoroelastomer parts which prevents to the greatest possible extent wear of the mold gate by inorganic fillers, and is particularly useful in LIMS molding. Another object of the invention is to provide a method for producing molded fluoroelastomer parts using this mold.

We have found that by surface-treating with diamond-like carbon at least the gate portion of a mold for molding inorganic filler-containing crosslinkable liquid fluoroelastomer compositions and making the cross-sectional area of the gate opening on the side of the mold cavity (i.e., the surface area of the gate portion where it opens out into the cavity) at least 0.075 $mm^2$, wear of the mold gate by the inorganic filler can be minimized, thereby increasing the useful life of the mold. In addition, the mold release properties are improved, resulting in molded fluoroelastomer parts of consistent quality and lower cost. We have additionally found that the amount of flash can be reduced by holding the thickness (depth) of the gate to not more than 0.2 mm.

Accordingly, the invention provides a mold for producing molded fluoroelastomer parts, the mold comprising a mold cavity, a gate through which an inorganic filler-containing crosslinkable liquid fluoroelastomer composition is injected into the mold cavity, a runner and a sprue through which the gate communicates with an injection molding machine. The gate is surface treated with diamond-like carbon and has a cross-sectional area where it opens out into the mold cavity of at least 0.075 $mm^2$.

The invention additionally provides a method for producing molded fluoroelastomer parts, wherein an inorganic filler-containing crosslinkable liquid fluoroelastomer composition is injected through the gate and into the cavity of the above mold, and thereby molded.

DETAILED DESCRIPTION OF THE INVENTION

Figure 1:
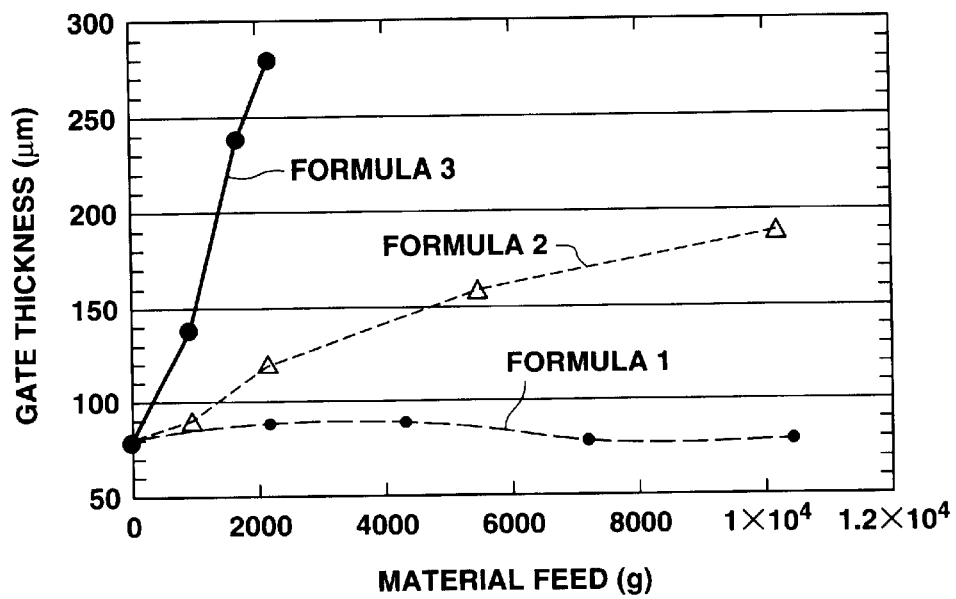
FIG. 1 is a graph of the material flow rate versus gate thickness which shows the influence on mold wear of differences in the average particle size of the inorganic filler.

The molding material used in the inventive mold and method for producing molded fluoroelastomer parts is an inorganic filler-containing crosslinkable liquid fluoroelastomer composition.

This liquid fluoroelastomer composition preferably comprises:

(A) 100 parts by weight of a perfluorocarbon compound bearing at least two alkenyl groups and having on the main chain divalent perfluoroalkylene or divalent perfluoropolyether structures, (B) a hydrosilyl group-bearing addition-reactive crosslinking agent and a crosslinking catalyst, in respective amounts sufficient to crosslink component (A), and (C) from 1 to 300 parts by weight of an inorganic reinforcing filler having an average particle size of at least 0.1 μm.

The first component (A) of the liquid fluoroelastomer composition is preferably a linear perfluorocarbon compound bearing at least two alkenyl groups, having on the main chain divalent perfluoroalkylene or divalent perfluoropolyether structures, and endowed with a viscosity at 25° C. of from 25 to 1,000,000 cSt. Examples of such perfluorocarbon compounds include compounds of general formula (1) below.

$$CH_2=CH-(X)_p-(Rf-Q)_a-Rf-(X)_p-CH=CH_2 \quad (1)$$

In the formula, each X is independently —CH$_2$—, —CH$_2$O—, —CH$_2$OCH$_2$—, —Y—NR$^1$—SO$_2$— or —Y—NR$^1$—CO— (wherein Y is

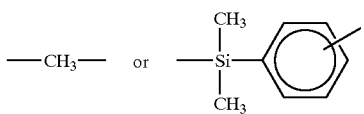

(ortho, meta or para),
and R$^1$ is a hydrogen atom or a substituted or unsubstituted monovalent hydrocarbon group). Rf is a divalent perfluoroalkylene group or a divalent perfluoropolyether group; and each p is independently 0 or 1. Q is a group of the following general formula (2), (3) or (4):

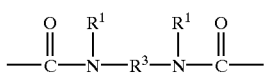

(2)

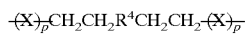

(3)

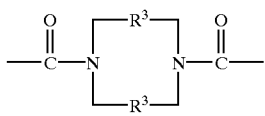

(4)

wherein X, p and R$^1$ are as defined above; R$^3$ is a substituted or unsubstituted divalent hydrocarbon group, and R$^4$ is a substituted or unsubstituted divalent hydrocarbon group which may have one or more intervening oxygen, nitrogen, silicon or sulfur atom, or is a group of the following general formula (5) or (6):

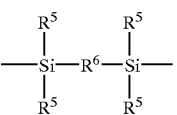

(5)

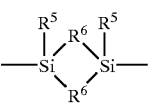

(6)

(R$^5$ being a substituted or unsubstituted monovalent hydrocarbon group; and R$^6$ being a group containing on the backbone one or more carbon, oxygen, nitrogen, silicon or sulfur atom).

The letter "a" is an integer inclusive of 0.

As noted above, Rf is a divalent perfluoroalkylene group or a divalent perfluoropolyether group. Here, the divalent perfluoroalkylene group preferably is a group of the formula —C$_m$F$_{2m}$— (wherein the letter m is from 1 to 10, and especially 2 to 6), and the divalent perfluoropolyether group preferably is a group having one of the following formulas:

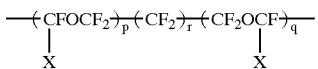

(wherein X is F or CF$_3$; and the letters p, q and r are respectively integers which satisfy the conditions p≧1, q≧1 and 2≦p+q≦200, and especially 2≦p+q≦110, and 0≦r≦6)

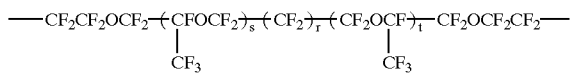

(wherein the letters r, s and t are respectively integers which satisfy the conditions 0≦r≦6, s≧0, t≧0 and 0≦s+t≦200; and especially 2≦s+t≦110),

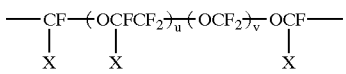

(wherein X is F or CF$_3$; and the letters u and v are respectively integers which satisfy the conditions 1≦u≦100 and 1≦v≦50) or —CF$_2$CF$_2$—(OCF$_2$CF$_2$CF$_2$)$_w$OCF$_2$CF$_2$—

(wherein w is an integer from 1 to 100, inclusive).
Specific examples of Rf include

—C$_4$F$_8$—, —C$_6$F$_{12}$—,

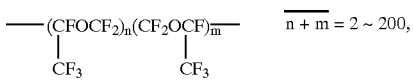

—CF$_2$CF$_2$OCF$_2$(CF$_2$)$_2$CF$_2$OCF$_2$CF$_2$—,

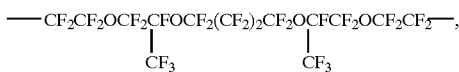

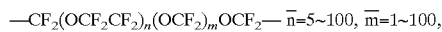 $\overline{n}=5\sim100$, $\overline{m}=1\sim100$,

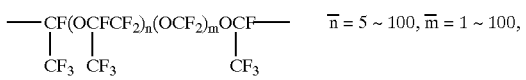 $\overline{n} = 5 \sim 100$, $\overline{m} = 1 \sim 100$,

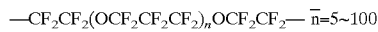 $\overline{n}=5\sim100$

As noted above, Q is a group of general formula (2), (3) or 4) below.

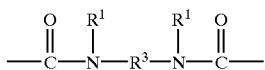 (2)

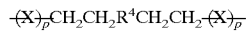 (3)

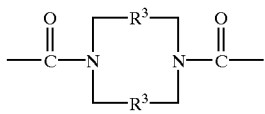 (4)

In the above formulas, $R^1$ is a hydrogen atom or a substituted or unsubstituted monovalent hydrocarbon group. Preferred substituted or unsubstituted monovalent hydrocarbon groups are those having 1 to 12 carbons. Illustrative examples include alkyl groups such as methyl, ethyl, propyl, isopropyl, butyl, isobutyl, tert-butyl, pentyl, neopentyl, hexyl, heptyl, octyl, nonyl and decyl; cycloalkyl groups such as cyclopentyl, cyclohexyl and cycloheptyl; aryl groups such as phenyl, tolyl, xylyl and naphthyl; aralkyl groups such as benzyl, phenylethyl and phenylpropyl; and halogen-substituted groups in which some or all of the hydrogens on the above monovalent hydrocarbon groups have been substituted with halogens such as fluorine, chlorine or bromine, examples of which include chloromethyl, bromoethyl, chloropropyl, trifluoropropyl and 3,3,4,4,5,5,6,6,6-nonafluorohexyl.

$R^3$ in the above formulas is a substituted or unsubstituted divalent hydrocarbon group having 1 to 10 carbons, and preferably 2 to 6 carbons. Specific examples include alkylene groups such as methylene, ethylene, propylene, methylethylene, butylene and hexamethylene; cycloalkylene groups such as cyclohexylene; arylene groups such as phenylene, tolylene, xylylene, naphthylene and biphenylene; and halogenated groups in which some or all of the hydrogens on the above divalent hydrocarbon groups have been substituted with halogens. In formula (4), the two $R^3$ groups may be like or unlike.

$R^4$ in above formula (3) is a substituted or unsubstituted divalent hydrocarbon group which may be separated by one or more oxygen, nitrogen, silicon or sulfur atom, or is a group of the following general formula (5) or (6):

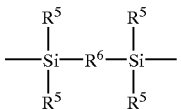 (5)

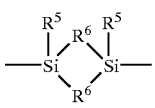 (6)

wherein $R^5$ is a substituted or unsubstituted monovalent hydrocarbon group; and $R^6$ is a group containing on the backbone one or more carbon, oxygen, nitrogen, silicon or sulfur atom.

In the groups of formulas (5) and (6) that may represent $R^4$, the monovalent hydrocarbon group $R^5$ is exemplified by the same substituted or unsubstituted monovalent hydrocarbon groups as mentioned above for $R^1$. Substituted or unsubstituted divalent hydrocarbon groups that may serve as $R^6$ include those having 1 to 20 carbons, and especially 1 to 10 carbons. Specific examples include alkylene groups such as methylene, ethylene, propylene, methylethylene, butylene and hexamethylene; cycloalkylene groups such as cyclohexylene; arylene groups such as phenylene, tolylene, xylylene, naphthylene and biphenylene; halogenated groups in which some of the hydrogens on the above groups have been substituted with halogen atoms; and combinations of these substituted or unsubstituted alkylene and arylene groups.

Other examples of $R^6$ include divalent groups containing on the backbone one or more oxygen, nitrogen, silicon or sulfur atom. In such cases, oxygen atoms may intervene as —O—, sulfur atoms as —S—, and nitrogen atoms as —NR— (R being a hydrogen atom, an alkyl having 1 to 8 carbons, and preferably 1 to 6 carbons or aryl). Silicon atoms may intervene as organosiloxane-containing groups or organosilylene groups. Specific examples include:

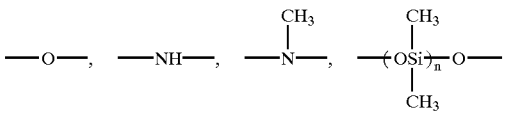

(n being an integer from 1 to 5)

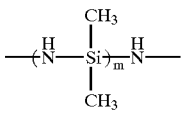

(m being an integer from 1 to 5)

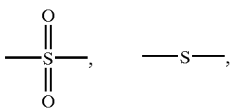

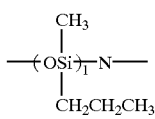

(l being an integer from 1 to 5)

Exemplary substituted or unsubstituted divalent hydrocarbon groups represented by $R^4$ which may have one or more intervening oxygen, nitrogen, silicon or sulfur atom include the substituted or unsubstituted divalent hydrocarbon groups mentioned above for $R^6$, and these same groups having intervening oxygen, nitrogen, silicon or sulfur atoms.

Illustrative examples of Q in formula (1) having above formula (2), (3) or (4) include the following. In the structural formulas shown below, "Me" represents methyl and "Ph" represents phenyl.

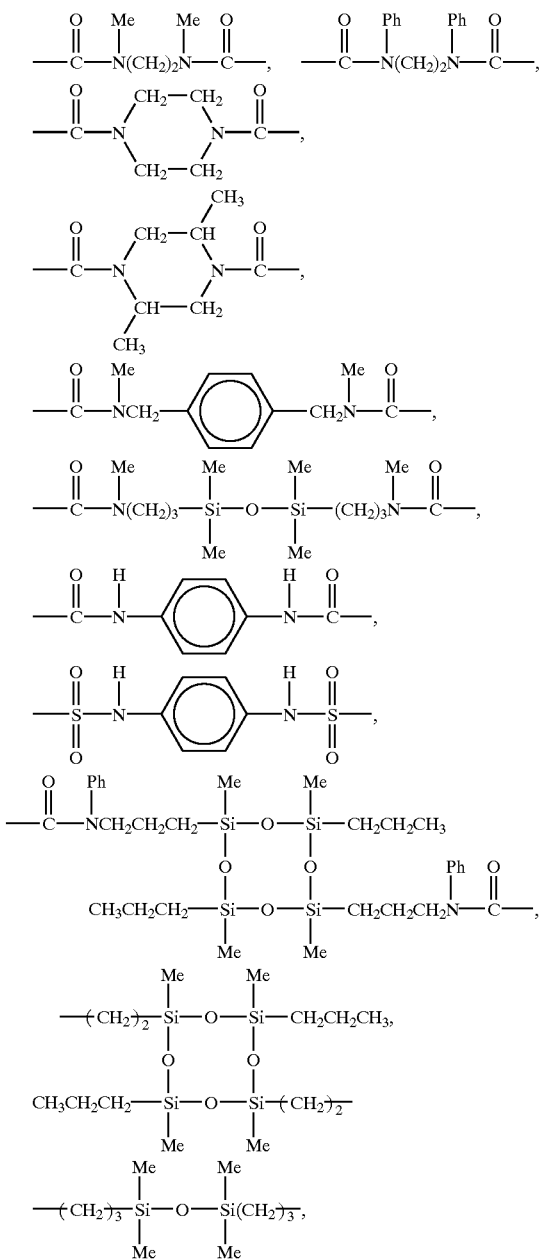

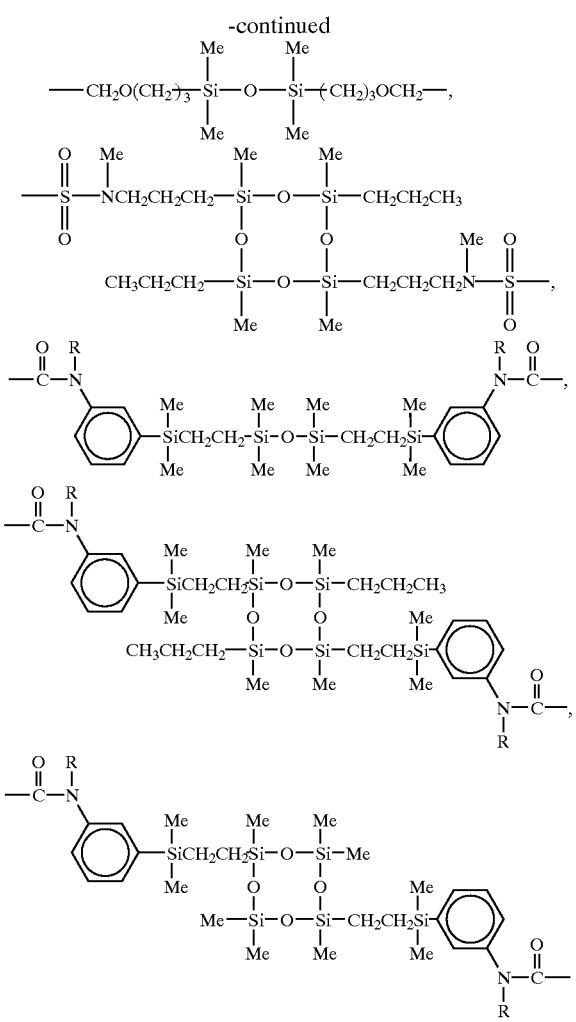

(wherein R is hydrogen, methyl or phenyl)

In formula (1), the letter "a" is an integer inclusive of 0, and so the perfluorocarbon compound of formula (1) includes on the molecule at least one divalent perfluoroalkylene or divalent perfluoropolyether group. The letter "a" is preferably an integer from 0 to 10, and especially from 0 to 6.

In formula (1), X is —$CH_2$—, —$CH_2O$—, —$CH_2OCH_2$—, —Y—$NR^1$—$SO_2$— or —Y—$NR^1$—CO— (wherein Y is

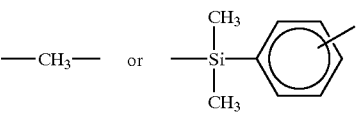

(ortho, meta or para) and $R^1$ is a hydrogen atom or a substituted or unsubstituted monovalent hydrocarbon group. $R^1$ is exemplified as described above, and is preferably methyl, phenyl or allyl.)

The letter p in formula (1) is 0 or 1, and the perfluorocarbon compound of formula (1) has at both ends a suitable group such as vinyl or allyl.

It is critical that the linear perfluorocarbon compound of formula (1) serving as component A of the crosslinkable liquid fluoroelastomer composition used in the invention have a viscosity at 25° C. within a range of 25 to 1,000,000 centistokes (cSt), and preferably 100 to 60,000 cSt. At a viscosity outside of this range, the composition is likely to be difficult to render into a cured elastomer product endowed with satisfactory properties, and to lower the ease of operation.

The crosslinking agent in component (B) of the fluoroelastomer composition may be an organic compound containing hydrosilyl groups or an organosilicon compound containing hydrosilyl groups. To achieve the desired dispersibility and heat resistance, the use of a compound of formula (7) or (8) below is desirable.

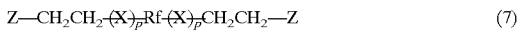  (7)

  (8)

In these formulas, X, p and Rf are as defined above; and Z is a group of general formula (9):

  (9)

wherein $R^7$ is a substituted or unsubstituted monovalent hydrocarbon; and b is 1, 2 or 3 in compounds of formula (7), and 2 or 3 in compounds of formula (8).

Here, each X is independently $-CH_2-$, $-CH_2O-$, $-CH_2OCH_2-$, $-Y-NR^1-SO_2-$ or $-Y-NR^1-CO-$ (Y being

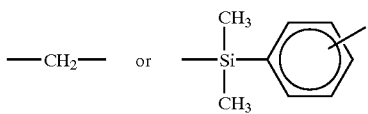

(ortho, meta or para) and $R^1$ being a hydrogen atom or a substituted or unsubstituted monovalent hydrocarbon group); Rf is a divalent perfluoroalkylene group or a divalent perfluoropolyether group; and each p is independently 0 or 1.

Rf, X and p are exemplified as described above. The Rf, X and p in formulas (7) and (8) may be like or unlike the Rf, X and p in formula (1).

In above general formula (9) representing Z, $R^7$ is a substituted or unsubstituted monovalent hydrocarbon group, preferably having from 1 to 8 carbons. Illustrative examples include alkyl groups such as methyl, ethyl, propyl, isopropyl, butyl, isobutyl, tert-butyl, pentyl, neopentyl, lo hexyl, heptyl and octyl; cycloalkyl groups such as cyclopentyl, cyclohexyl and cycloheptyl; aryl groups such as phenyl, tolyl and xylyl; aralkyl groups such as benzyl and phenylethyl; and halogenated groups in which some or all of the hydrogens on these monovalent hydrocarbon groups have been substituted with halogens (e.g., fluorine, chlorine, bromine), such as chloromethyl, bromoethyl, chloropropyl, trifluoropropyl and 3,3,4,4,5,5,6,6-nonafluorohexyl.

The crosslinking agent in component (B) of the fluoroelastomer composition preferably has a viscosity at 25° C. of from 10 to 5,000 cSt.

The crosslinking catalyst serving as the other constituent in component (B) is a catalyst for the addition reaction (hydrosilylating reaction) between component (A) and the crosslinking agent. A platinum family metal compound is generally used for this purpose.

The platinum family metal compound is generally a noble metal compound. Such compounds are on the whole very expensive, and so use is commonly made of a platinum compound which is somewhat more readily available.

Illustrative, non-limiting examples of suitable platinum compounds include chloroplatinic acid, complexes of chloroplatinic acid with an olefin such as ethylene, complexes of chloroplatinic acid with an alcohol or a vinylsiloxane, and platinum/silica, platinum/alumina and platinum/carbon. Platinum family metal compounds other than platinum compounds that may be used include rhodium, ruthenium, iridium and palladium compounds. Illustrative examples include $RhCl(PPh_3)_3$, $RhCl(CO)(PPh_3)_2$, $RhCl(C_2H_4)_2$, $Ru_3(CO)_{12}$, $IrCl(CO)(PPh_3)_2$ and $Pd(PPh_3)_4$.

No particular limitation is imposed on the amount in which such catalysts are used, provided the desired curing rate can be achieved. However, to obtain a good cured product at a reasonable cost, the amount of catalyst (platinum family metal basis) is preferably within an approximate range of 0.1 to 1,000 ppm, and especially 0.1 to 500 ppm.

The inorganic reinforcing filler serving as component (C) has an average particle size within a range of preferably 0.1 to 20 $\mu$m. An average particle size of less than 0.1 $\mu$m may compromise the fluidity of the liquid fluoroelastomer composition, whereas an average particle size greater than 20 $\mu$m may lower the reinforcing properties. An average particle size within a range of 0.5 to 10 $\mu$m is especially advantageous for achieving better flow, reinforcing properties, hardness control and compression set. Illustrative examples of suitable fillers include diatomaceous earth, crystalline silica, clay, alumina and various types of metal oxide powders.

The strength can be enhanced by the concomitant use, together with these fillers, of a filler having a small particle size.

Various additives can be added as needed to the liquid fluoroelastomer compositions of the invention in order to increase their practical utility. Illustrative examples of such additives include $CH_2=CH(R)SiO$ unit-containing polysiloxane wherein R is hydrogen or a substituted or unsubstituted monovalent hydrocarbon group (JP-B 48-10947) and acetylene compounds (U.S. Pat. No. 3,445,420 and JP-B 54-3774) for controlling the curing rate of the liquid fluoroelastomer composition, and also ionic heavy metal compounds (U.S. Pat. No. 3,532,649).

The liquid fluoroelastomer compositions of the invention may have fillers added thereto in order to reduce heat shrinkage during the cure and modify various properties of the elastomeric body obtained with curing, such as lowering the thermal expansion coefficient, improving heat stability, weather resistance, chemical resistance, fire retardance and mechanical strength, and reducing gas permeability. Examples of additives that may be used for this purpose include fumed silica, quartz powder, glass fibers, carbon, metal oxides such as iron oxide, titanium oxide and cerium oxide, and metal carbonates such as calcium carbonate and magnesium carbonate. Suitable pigments, dyes and antioxidants may also be added as needed.

The mold of the invention is made of a well-known metallic material such as steel, and is designed for the injection therein of the crosslinkable liquid fluoroelastomer composition described above. The mold construction includes a mold cavity, a gate through which the composition is injected into the cavity, a runner and a sprue through which the gate communicates with an injection molding machine. Molds of a type commonly used in LIMS molding are particularly suitable. The invention requires that the mold be surface-treated with diamond-like carbon on at least the surface of the gate, and possibly both the gate surface and surfaces of the cavity which communicate therewith.

This can be explained as follows. Molds for molding the above type of inorganic filler-containing liquid fluoroelastomer composition generally are surface treated for a number of reasons, such as to enhance wear resistance, prevent corrosion and improve mold release. In a mold that has been given a conventional surface treatment such as nickel plating or chrome plating, the passage of a composition containing relatively large filler particles abrades the gate at places where the thickness, or depth, of the gate narrows. While the titanium-based surface treatment agents used for wear-resistant surface treatment do reduce somewhat the degree of wear, even these cannot impart the durability needed to withstand mass production.

After carefully studying various types of mold surface treatment, we have discovered that only treatment with diamond-like carbon (DLC) will achieve the desired effects. Hence, we have limited mold surface treatment in this invention to DLC treatment.

DLC treatment is carried out by pyrolyzing a hydrocarbon gas with an arc-discharge plasma in a high vacuum and electrically accelerating ions and excited molecules in the plasma so that they energetically impinge on the mold surface, forming thereon a DLC film having a dense amorphous structure. Because the surface of the film is very slippery and free of crystal grain boundaries, it exhibits highly desirable properties such as a low friction coefficient, good wear resistance and good mold release properties.

Furthermore, in addition to mold wear resistance, such DLC treatment provides also outstanding mold releasability. This has several specific advantages, such as (1) reducing the rejection rate due to tearing of the molded part when it is removed from the mold, (2) greatly facilitating removal of the molded part from the mold and thus making it possible to shorten the molding cycle, and (3) enabling molded parts to be removed without the use of a mold release agent, which prevents mold fouling by mold release agents and eliminates the need to wash the mold.

The DLC treatment described above can be carried out by a known method. The DLC film may be formed to any suitable thickness, although a thickness of 0.01 to 5 $\mu$m, and especially 0.1 to 2 $\mu$m is especially preferred.

In the mold of the invention, the gate has a cross-sectional area where it opens out into the mold cavity (referred to hereinafter as the "gate cross-sectional area") of at least 0.075 mm$^2$, preferably at least 0.1 mm$^2$, and most preferably at least 0.2 mm$^2$; but preferably not more than 10 mm$^2$, and most preferably not more than 1 mm$^2$. At a gate cross-sectional area smaller than 0.075 mm$^2$, when the liquid fluoroelastomer composition passes through the gate whose surface has been DLC treated, the filler acts as an abrasive by wearing away at the gate. As a result, the mold may not be durable enough for mass production although the DLC film is superior to a conventional surface treatment such as chrome plating.

The mold of the invention preferably has a gate thickness, or depth, within a range of 0.01 to 0.2 mm. It is therefore recommended that the gate thickness be set within this range and that the gate width be selected accordingly, such as to give a gate cross-sectional area within the above-indicated range. As the gate cross-sectional area increases, flash becomes more difficult to remove. That is, flash tends to be pulled or torn off during the deflashing operation, resulting in a high molded part rejection rate. On account of its properties on curing, the liquid fluoroelastomer composition described above is often used in O-rings and other types of seals. In such applications, the presence of even a very small flash on the molded part can significantly lower the sealing properties. Hence, the presence of such flash is generally limited by quality specifications. For this reason, the gate thickness is preferably set within a range of 0.01 to 0.2 mm. At less than 0.01 mm, the passage of material through the gate tends to become poor. On the other hand, at more than 0.2 mm, deflashing is often more difficult to carry out. A gate thickness within a range of 0.05 to 0.1 mm is even more preferred. Flash thickness specifications for parts such as aircraft O-rings are often set at 0.13 mm or less. Hence, the inventive mold has an ideal construction for this type of application.

Suitable conditions for molding the liquid fluoroelastomer compositions described above using the mold of the invention include an injection rate of 0.01 to 1,000 cc/s. An injection rate below this range may result in a very poor production efficiency, whereas a rate above this range may lead to such problems as air entrainment into the molded part and scorching. An injection rate within a range of 0.1 to 500 cc/s is especially preferred.

Curing should be carried out for the length of time required to effect crosslinking at a curing temperature of 80 to 200° C., generally a period of 1 to 600 seconds. If the curing temperature is too low, the curing time increases and the production efficiency declines. On the other hand, if the curing temperature is too high, crosslinking proceeds as the composition flows within the mold; the resulting loss of material flow renders molding impossible. A temperature setting within a range of 100 to 180° C. is especially preferred.

As described above, the invention lowers wear of the mold gate, thereby increasing mold durability. In addition, the mold release properties are improved. The net effect of these changes is to enhance the quality of the molded parts and to reduce the frequency of mold replacement, thereby making it possible to cut production costs.

EXAMPLE

Examples of the invention and comparative examples are given below by way of illustration, and are not intended to limit the invention.

The materials used in the examples are listed below.

Polymer (Perfluorocarbon Compound)

Viscosity, 4,400 cSt; average molecular weight, 16,500; vinyl group content, 0.013 mol/100 g.

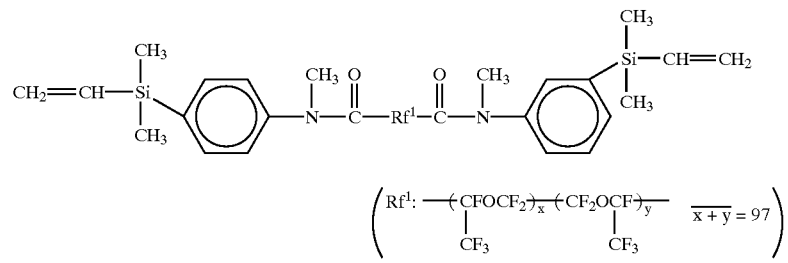

Addition-Reactive Crosslinking Agent

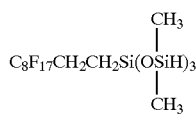

Filler 1: R972 (trade name), manufactured by Nippon Aerosil Co., Ltd. A fumed silica treated with a silicon-based surface treatment agent. Average particle size, 7 nm.

Filler 2: Radiolite SPF (trade name), manufactured by Showa Chemical Industry Co., Ltd. Diatomaceous earth powder. Average particle size, 1.1 μm.

Filler 3: Radiolite F (trade name), manufactured by Showa Chemical Industry Co., Ltd. Diatomaceous earth powder. Average particle size, 7 μm.

Catalyst: PL50T (trade name), manufactured by Shin-Etsu Chemical Co., Ltd.

Reaction Regulator: Ethynylcyclohexanol (50% solution in toluene)

The formulations are shown in Table 1.

TABLE 1

| Components (pbw) | Average particle size | Formula 1 | Formula 2 | Formula 3 |
|---|---|---|---|---|
| Polymer | — | 100 | 100 | 100 |
| Filler 1 | 7 nm | 20 | 0 | 0 |
| Filler 2 | 1.1 μm | 0 | 25 | 0 |
| Filler 3 | 7 μm | 0 | 0 | 25 |
| Crosslinker | — | 3.3 | 3.3 | 3.3 |
| Catalyst | — | 0.2 | 0.2 | 0.2 |
| Reaction regulator | — | 0.4 | 0.4 | 0.4 |

Test Example

Using a LIMS molding machine (manufactured by Nissei Plastic Industrial Co., Ltd. under the trade name HM-7, to LIMS specifications) and a steel mold in which the surfaces of the gate and cavity had been chrome plated and the mold gate had a width of 1 mm, a thickness (depth) of 0.05 mm and a length of 0.1 mm, the liquid elastomer compositions of Formulas 1 to 3 above were injected into the mold at a rate of 1 cc/s and a mold temperature of 140° C. The gate wear (change in gate thickness) was evaluated. The results are presented in Table 2 and FIG. 1.

To measure the gate thickness (gate depth) shown in FIG. 1, 2 g of millable fluoroelastomer composition (manufactured by Shin-Etsu Chemical Co., Ltd. under the trade name Sifel 5700) was press-molded in the mold mounted on the LIMS molding machine, then cured at 140° C. for 20 minutes. The cross-section of the gate portion on the resulting molded piece was measured using a microscope micrometer.

TABLE 2

| | Average particle size of filler | Mold wear |
|---|---|---|
| Formula 1 | 7 nm | None |
| Formula 2 | 1.1 μm | Caused some wear |

TABLE 2-continued

| | Average particle size of filler | Mold wear |
|---|---|---|
| Formula 3 | 7 μm | Caused severe wear |

From the results in FIG. 1 and Table 2, it is apparent that mold wear becomes more rapid as the particle size of the filler increases. Because the filler having a particle size of 1.1 μm causes some wear, it appears reasonable to assume that over the long term even a filler having an average particle size of 0.1 μm will result in wear.

Example 1

Comparative Examples 1 to 4

Figure 2:
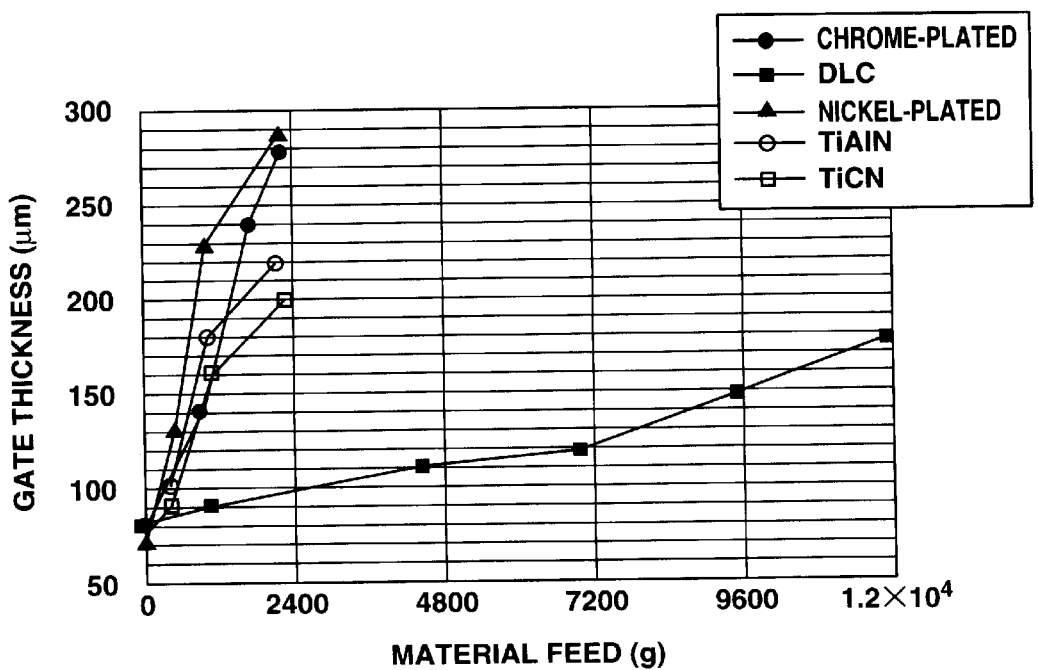
FIG. 2 is a graph of the material flow rate versus gate thickness which shows the effect on mold wear of various mold gate surface treatment methods.

The Formula 3 composition was injected by the same method and into molds of the same type as in the Test Example, the only difference being that the gate and cavity surfaces in the mold were plated as shown in Table 3. The condition of wear at the mold gate (change in gate thickness) was evaluated in each of these examples. The plating film thickness in the respective examples was 1 μm. The results are presented in Table 3 below and FIG. 2.

TABLE 3

| Plating type | Mold wear durability | |
|---|---|---|
| Nickel plating | None | Comp. Ex. 1 |
| Chrome plating | None | Comp. Ex. 2 |
| TiAlN | None | Comp. Ex. 3 |
| TiCN | None | Comp. Ex. 4 |
| DLC | Modest wear that does not pose a problem | Example 1 |

These results show that the durability is much lower when surface treatment agents other than DLC are used.

Given that the flash thickness tolerance for O-rings used in aircraft is generally 0.13 mm or less, these gate thickness results following material feed into the mold (FIG. 2) demonstrate that mold surface treatment other than with DLC is ineffective and leads to rapid wear beyond the indicated tolerance.

Example 2

Figure 3:
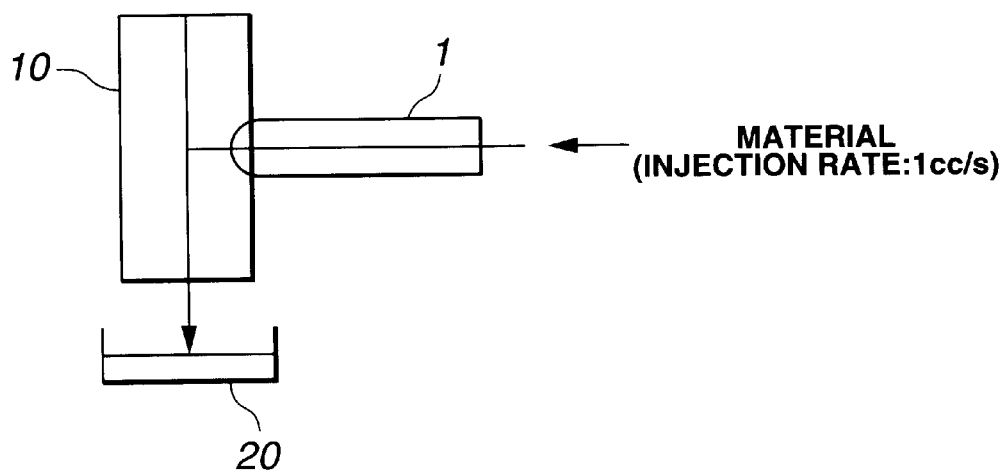
FIG. 3 is a schematic view of the molding apparatus used in Example 2 of the invention.

Twelve kilograms of the Formula 3 elastomer composition was injected, as shown in FIG. 3, from the screw of an injection molding machine 1 into a mold 10 at an injection rate of 1 cc/s, following which the condition of gate wear (change in gate thickness) was evaluated. The mold temperature at this time was 140° C. FIG. 3 also shows a receptacle 20 for uncured material.

Figures 5A, 5B:
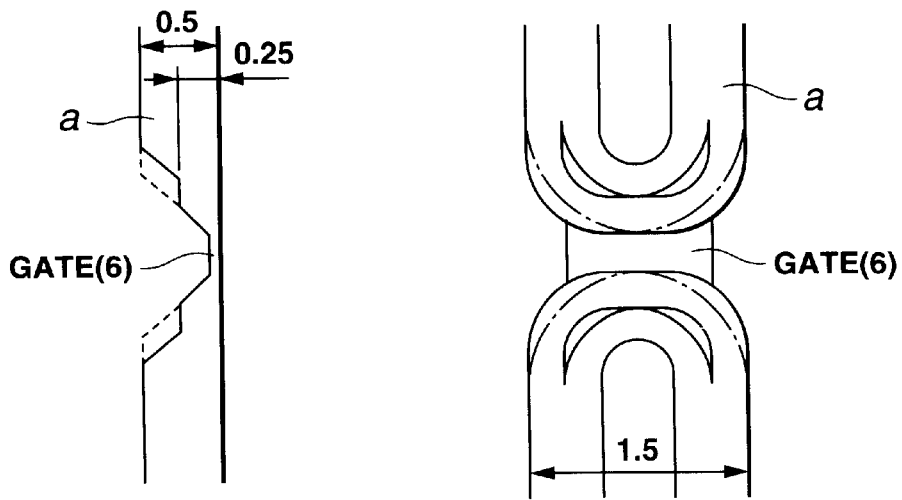
FIGS. 5A and 5B are enlarged side and front views of the area marked "X" in FIG. 4, respectively.
Figure 4A:
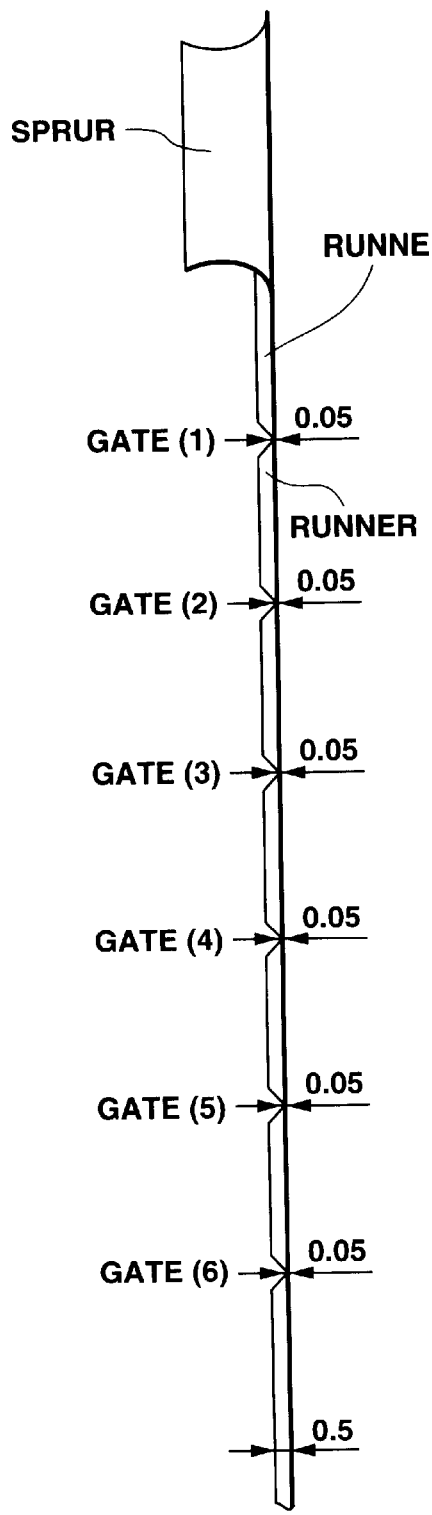
FIGS. 4A and 4B are side and front views of the gates and runners in the mold used in the same example, respectively.
Figure 4B:
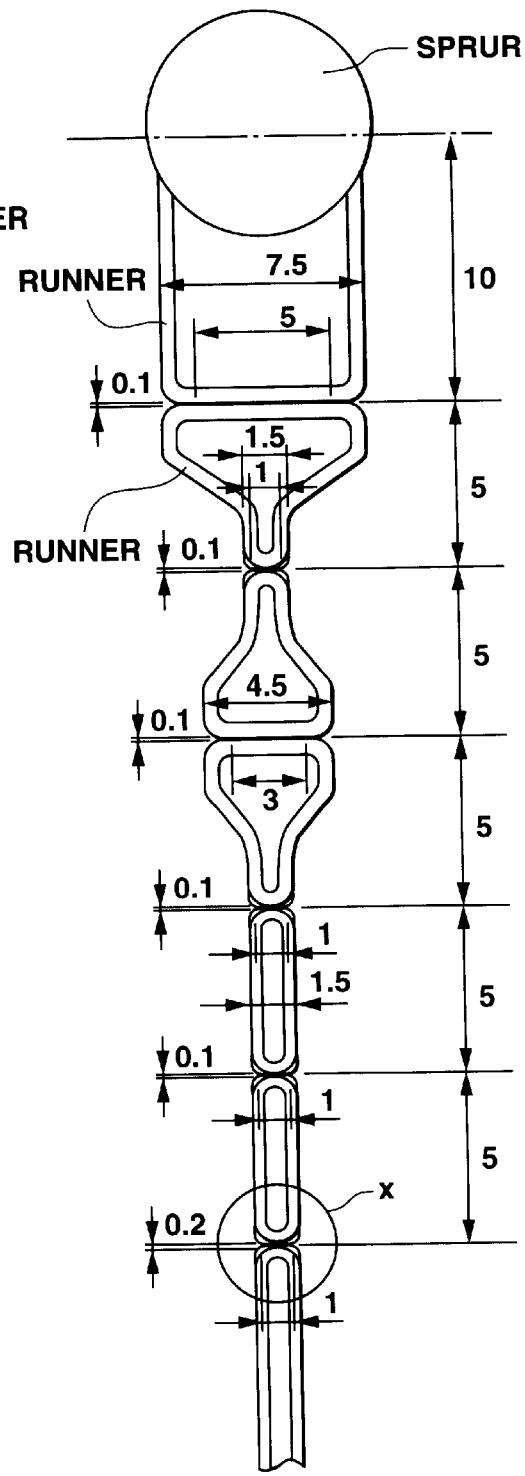

The mold used in this example is shown in greater detail in FIGS. 4 and 5. In the figures, "a" is a runner in the mold. The surfaces of both the gates and the mold cavity were DLC treated (DLC film thickness, 1 μm). The results are presented in Table 4 below.

TABLE 4

| Gate | (1) | (2) | (3) | (4) | (5) | (6) |
|---|---|---|---|---|---|---|
| Design Values (mm) | | | | | | |
| Width | 7.5 | 1.5 | 4.5 | 1.5 | 1.5 | 1.5 |
| Length | 0.1 | 0.1 | 0.1 | 0.1 | 0.1 | 0.2 |
| Gate depth | 0.05 | 0.2 | 0.05 | 0.1 | 0.05 | 0.05 |
| Cross-sectional area (mm$^2$) | 0.375 | 0.3 | 0.25 | 0.15 | 0.075 | 0.075 |
| Measured Values ($\mu$m) | | | | | | |
| Initial gate thickness | 80 | 230 | 80 | 120 | 80 | 80 |
| Gate thickness after material feed | 150 | 270 | 170 | 220 | 200 | 260 |
| Amount of wear | 70 | 40 | 90 | 100 | 120 | 180 |

Amount of wear: Difference between gate thickness after injecting 12 kg of material and initial gate thickness.

The results in Table 4 show that a correlation exists between the cross-sectional area of the gate and the amount of wear. That is, as the cross-sectional area becomes larger, the wear decreases. It can readily be seen from these results that the wear probably becomes severe at cross-sectional areas of less than 0.075 mm$^2$ When the gate portions of the test gate moldings obtained in Examples 1 and 2 were pulled off in a deflashing step, at a gate thickness of up to 0.2 mm, the gate portions were easily and cleanly cut off. However, at a gate thickness above 0.3 mm, the gate portions could not be cut off without tearing off also other material from the molded piece. This means that at a gate thickness of up to 0.2 mm, the deflashing operation takes place in much the same way as for cut-off without damaging the molded piece. However, at gate thicknesses greater than this, material is torn away from the molded piece when the flash is removed, resulting in an unacceptable product.

These results demonstrate that, not only the cross-sectional area, but the gate thickness as well, is important in gate design, and that the upper limit in the gate thickness is preferably not more than 0.2 mm.

Example 3

Based on the results obtained in Examples 1 and 2, aircraft O-rings (AS3209-214) were actually molded from the Formula 3 composition using a mold having type (5) gates in Table 4. The resulting O-rings had good mold release properties, enabling the product to be easily removed from the mold.

When the molded parts were deflashed, the gate portions were easy to remove and substantially no flash was observed on the finished product.

Japanese Patent Application No. 11-122400 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for producing molded fluoroelastomer parts, comprising injecting an inorganic filler-containing crosslinkable liquid fluoroelastomer composition through a gate and into a mold cavity of a mold, thereby molding said composition, wherein the crosslinkable liquid fluoroelastomer composition comprises:

(A) 100 parts by weight of a perfluorocarbon compound bearing at least two alkenyl groups and having on the main chain divalent perfluoroalkylene or divalent perfluoropolyether structures, (B) a hydrosilyl group-bearing addition-reactive crosslinking agent and a crosslinking catalyst, in respective amounts sufficient to crosslink component (A), and (C) from 1 to 300 parts by weight of an inorganic reinforcing filler having an average particle size of at least 0.1 $\mu$m, and wherein at least the gate is surface treated with diamond-like carbon and has a cross-sectional area where it opens out into the mold cavity of at least 0.075 mm$^2$.

2. The method of claim 1, wherein the gate has a depth of from 0.01 to 0.2 mm.

3. The method of claim 1, wherein the mold has a runner and a sprue through which the gate communicates with an injection molding machine.

* * * * *